United States Patent
Dietz

(10) Patent No.: US 8,553,896 B2
(45) Date of Patent: Oct. 8, 2013

(54) DIRECT VOCAL AND INSTRUMENT MONITOR

(76) Inventor: Ryan Dietz, Watertown, MA (US)

( * ) Notice: Subject to any disclaimer, the term of this patent is extended or adjusted under 35 U.S.C. 154(b) by 345 days.

(21) Appl. No.: 12/590,068

(22) Filed: Nov. 2, 2009

(65) Prior Publication Data

US 2010/0284545 A1    Nov. 11, 2010

Related U.S. Application Data

(63) Continuation of application No. PCT/US2008/062145, filed on May 1, 2008.

(60) Provisional application No. 60/915,223, filed on May 1, 2007.

(51) Int. Cl.
    *H04R 29/00*    (2006.01)

(52) U.S. Cl.
    USPC .......... 381/58; 381/79; 381/118; 84/624; 84/625

(58) Field of Classification Search
    USPC ........... 455/569.1, 565, 557, 556.1; 340/505, 340/539; 370/260; 381/77, 79–85, 74, 309, 381/118, 122, 119, 58; 84/184, 624, 625
    See application file for complete search history.

(56) References Cited

U.S. PATENT DOCUMENTS

| | | | |
|---|---|---|---|
| 5,563,358 A | 10/1996 | Zimmerman | |
| 5,822,440 A | 10/1998 | Oltman et al. | |
| 5,982,904 A | 11/1999 | Eghtesadi et al. | |
| 6,542,611 B1 * | 4/2003 | Lane et al. | 381/66 |
| 6,952,483 B2 * | 10/2005 | Boesen et al. | 381/326 |
| 7,024,155 B2 * | 4/2006 | Gosieski, Jr. | 455/3.01 |
| 7,231,233 B2 * | 6/2007 | Gosieski, Jr. | 455/569.1 |
| 7,262,358 B2 | 8/2007 | Lubbers | |
| 2002/0102000 A1 * | 8/2002 | Tanaka | 381/77 |
| 2002/0149705 A1 * | 10/2002 | Allen et al. | 348/734 |
| 2004/0091126 A1 * | 5/2004 | Hirade et al. | 381/119 |
| 2004/0264716 A1 * | 12/2004 | Fidlin et al. | 381/161 |
| 2006/0278068 A1 * | 12/2006 | Nielsen et al. | 84/746 |
| 2007/0003073 A1 * | 1/2007 | Iriarte | 381/77 |
| 2009/0074196 A1 | 3/2009 | Tiodor et al. | |

* cited by examiner

*Primary Examiner* — Vivian Chin
*Assistant Examiner* — Friedrich W Fahnert
(74) *Attorney, Agent, or Firm* — Novak Druce Connolly Bove + Quigg LLP

(57) ABSTRACT

The present invention relates to direct voice and instrument monitoring systems and methods of use thereof.

21 Claims, 7 Drawing Sheets

Microphone Clip Version

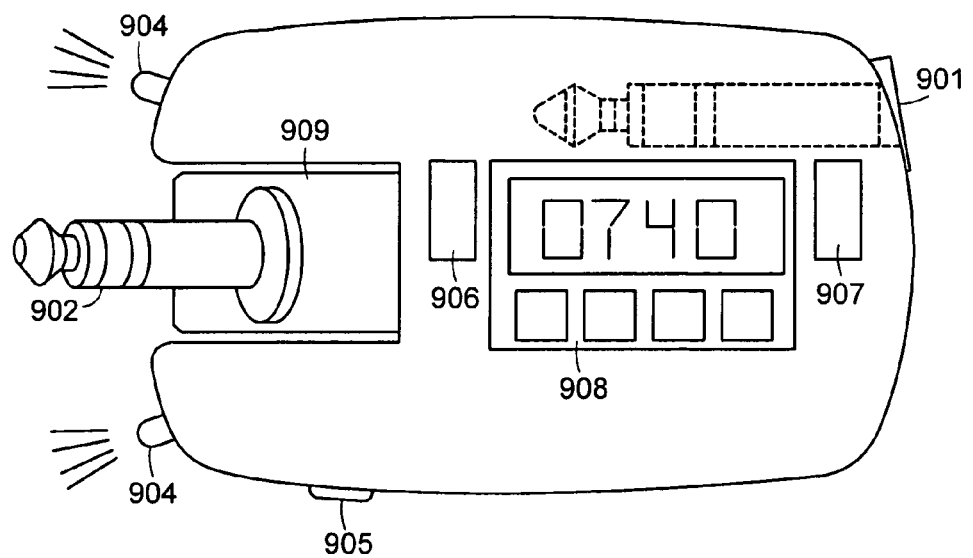
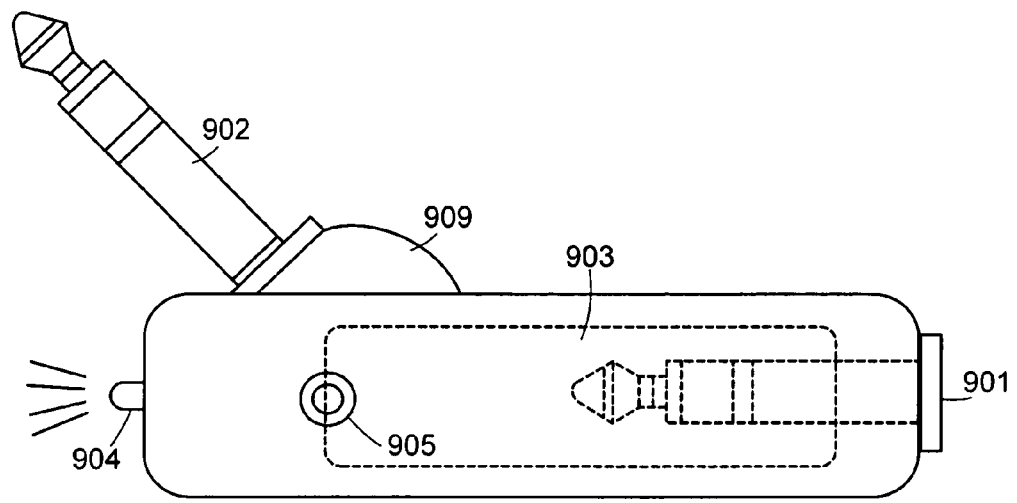
FIG. 8

DIRECT VOCAL AND INSTRUMENT MONITOR

RELATED APPLICATIONS

This application is a continuation of International Application Serial No. PCT/US2008/062415, filed May 1, 2008, which claims the benefit of U.S. Provisional Application Ser. No. 60/915,223, filed May 1, 2007. The entire contents of each of which are hereby incorporated herein by reference in their entirety.

BACKGROUND

Hearing ones own voice has long been known by vocal performers as important to successful vocal performance, as evidenced by the number of tools and electronic vocal and instrument monitoring and recording products developed over many years. Products range from well-designed auditoriums, state of the art wireless in-ear vocal and instrument monitoring, to the time tested closing of one ear to perceive their own voice through the vibrations in their own head.

Vocal and instrument monitoring equipment and technology remains quite expensive, putting it out of reach of most musicians. Even with advances in technology, prices are still prohibitive for most vocalists and musicians to use newer technologies such as in-ear monitoring. Moreover, the space requirements and heavy equipment used in industry standard wedge or side monitoring systems are quite complicated and cumbersome.

Therefore, inexpensive and easy to use vocal monitors are needed in the art. Musicians need a system that is inexpensive, simple, compact and thereby easy to utilize at performances and rehearsals of all kinds.

SUMMARY

Provided herein are systems and method of vocal and instrument monitoring that provide low-cost, user friendly, high quality voice and instrument monitoring. Advantages may include, for example, one or more of the following: direct transmission to the users ear(s); no need for transmitter body-pack to return signal to musician from traditional mixing board, and then pass it along to ear pieces; allow for higher level before feedback through a closed system; does not use traditional monitoring equipment on stage, such as stage wedge, side fill, or microphone-stand mounted, resulting in lower power consumption, less weight and mass to transport; allows one to control the sound and monitor mix on-stage thereby increasing an individuals ability to control and effectively monitor their voice; there is also no need to use long-range public open airwaves that can cause difficulty finding usable frequency, and risking distortion or interference.

The systems and methods described herein also result in less vocal strain, increased performance accuracy, protection against hearing damage from feedback, portability, simplicity in set-up and use, lower power consumption, increased user control, simplified monitoring conducted by user only, less microphone bleeding, and/or will lower the expense of vocal and instrument monitoring.

In one aspect, provided herein are direct personal monitoring systems comprising a short-range communication system in communication with a monitoring device and a vocal capture system or musical instrument.

In one embodiment, the short-range communication system comprises a Bluetooth, Kleer, Infrared, personal area network device, RF, or other wireless data transmission protocol.

In another embodiment, the monitoring device comprises headphones, earpieces, headset, earbuds, or earphones.

In one embodiment, the short-range communication system is integral with the vocal capture system.

In another embodiment, the vocal capture system comprises a wired or wireless microphone.

In one embodiment, the short-range communication system is located between microphone or instrument and cord.

In one embodiment, the short-range communication system and the vocal capture system are connected with one or more of male/female XLR cable connections, male/female ¼ inch cable connections, male/female ⅛ inch cable connections, USB, IEEE 1394 interface (FireWire), or other digital interface.

In one embodiment, the short-range communication system and the musical instrument are connected with one or more of male/female XLR cable connections, male/female ¼ inch cable connections, male/female ⅛ inch cable connections, USB, IEEE 1394 interface (FireWire), or other digital interface.

In one embodiment, the short-range communication system and an acoustic musical instrument are connected temporarily or permanently by clip, fastener or other attachment system.

In one embodiment, the short-range communication system comprises a transmitter.

In another embodiment, the transmitter is adapted to transmit to one or more monitoring devices.

In one embodiment, the monitoring device comprises one or more of ear-pieces (buds, phones or behind-ear style).

In one embodiment, the monitoring device is wired to the vocal capture system.

In another embodiment, the vocal capture device and/or the short-range communication device further comprises a sound modulating system.

In one embodiment, the modulating system is adapted to modulate one or more of reverberation, delay, volume, sound canceling, compression, limiting, gating, pitch shift and correction, harmonizer, thickening or doubling, chorus, flanger, phaser, distortion, tremolo and equalization (EQ).

In one embodiment, the sound modulating system is further adapted to communicate with a sound board (e.g., mixing board or sound modulating controller).

In another embodiment, the vocal capture system further comprises a sound level meter and controller.

In one embodiment, the sound level meter comprises an indicator.

In another embodiment, the indicator comprises a light or LED.

In one embodiment, one or more of the monitoring device or the vocal capture system comprises a power indicator.

In one embodiment, the monitoring device further comprises an ambient volume controller.

In another embodiment, one or more of the short-range communication system, the monitoring devices and the vocal capture system are rechargeably powered.

In one embodiment, one or more of the short-range communication systems are received by a central receiver device which can modulate the sound and return a user defined mix of signals to the user worn monitoring device.

In one aspect, provided herein are methods of monitoring a voice comprising transmitting wirelessly a sound captured by a vocal capture system via a short-range communication system to a monitoring device.

In one aspect, provided herein are methods of controlling and/or improving sound mixing, comprising: transmitting wirelessly a sound captured by a vocal capture system via a short-range communication system to a monitoring device.

In one aspect, provided herein are methods of aiding, curing, and/or alleviating hearing-based speech impediments, comprising: amplifying directly a speaker's voice into a monitoring device thereby allowing monitoring of voice level, tone and quality.

In one aspect, provided herein are methods of monitoring a voice in a way to lower the likelihood of hearing damage for user of monitoring device.

In one aspect, the invention provides methods of monitoring sound using the personal monitoring devices disclosed herein.

Other aspects and embodiments are disclosed infra.

BRIEF DESCRIPTION OF THE DRAWINGS

FIG. 8 shows a top and side view of an instrument linked monitoring device.

DETAILED DESCRIPTION

Figure 1:
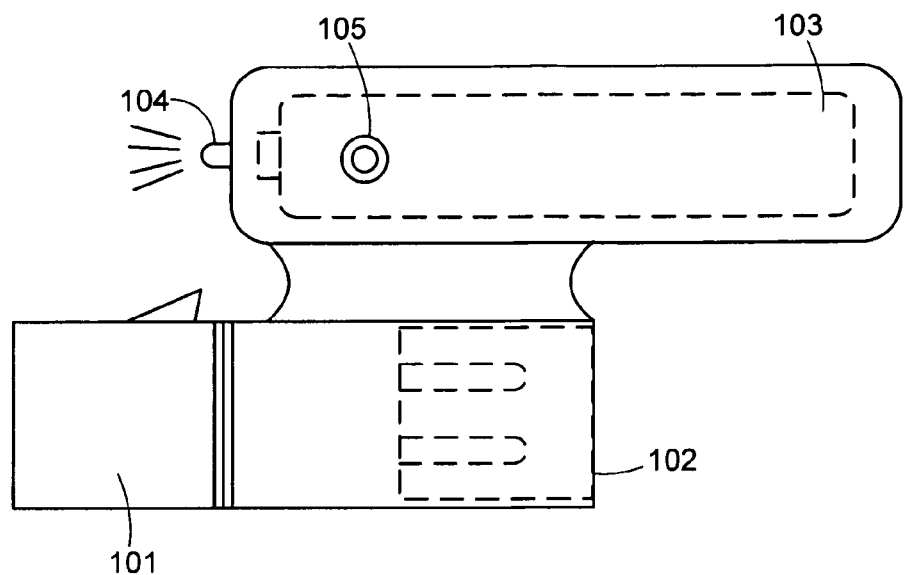
FIG. 1 shows a side view signal conversion, separation and transmission apparatus.

Presented herein is a direct personal monitoring (DPM) system and methods that have benefits for users over currently available monitoring systems. The DPM systems described herein comprise, for example, closed systems because it creates little to no ambient sound (e.g., audible to non-users), but allows vocal and instrument monitoring for the intended user(s). The DPM system is also a direct system, e.g., sending sound directly to the user(s) ear, allowing the user(s) to monitor their voice or instrument without the use of any remote (e.g., off-stage) device or devices that are out of personal control or reach.

The systems and methods described herein allow one to hear directly what a vocal capture system (e.g., microphone) or instrument is sending to the amplifier, speakers or soundboard and thereby the audience, in order to better monitor and maintain voice, pitch, volume, timbre, clarity and quality.

In certain embodiment, the systems utilize a microphone mounted or embedded short-range communication system sending wireless or wired digital or analog signals transmitted to a monitoring device that receives the transmitted signal and reproduces the sound in one or more ear mounted speakers. This allows for drastically simpler, less expensive, vocal and instrument monitoring in a more portable, lighter weight package while using lower power consumption and also allowing the system to be controlled entirely by the user.

The subsequently listed benefits allow the present invention to underlie various products capable of entering markets not currently being met by traditional in-ear or wedge and side-fill monitors. These markets make up the vast majority of musical performances worldwide. The methods and systems described herein, however, have many more uses than just vocal and instrument monitoring for musical performances, for example, speech therapy, inter-group communications, guided tours, radio station or other broadcast uses, speeches and presentations, monitor instrument performance (e.g., brass, reed or woodwind instruments) as will be understood by one of skill in the art.

In certain embodiments, the monitor will be an "in-ear monitor" or "IEM." As used herein IEM refers to a system of small, usually custom fitted, earpieces and transmitters used to provide monitoring that in the past was fed to speakers in front or to a side of a performer on a stage. Wireless in-ear monitor systems are increasingly popular with musicians, since they allow more precise monitoring and freer movement on stage than fixed monitor speakers, and can incorporate sound-insulated earbuds to provide hearing protection. For performances that include pre-recorded backing tracks, IEM let the entire band synchronize with a click track without wearing cumbersome headphones. In-ear monitor can also refer to any headphone with sound-insulating earbuds which are placed inside the ear canal. Examples of IEM include, for example, the HEARSAFE. IEMs may also be found commercially from other manufacturers, for example, Shure, Garwood, and Sennheiser.

In certain embodiments, the systems will further comprise ambient volume controller mechanism, for example, to allow ambient sound to pass freely through the ear piece or be amplified and recreated in the ear piece allowing for lower stage volumes and thereby protect against hearing damage often resulting from excessive stage volumes. This can be done through increasing or decreasing the depth of the monitor in the ear canal or increasing or decreasing the amount of coverage of the ear canal to ambient sounds. Introducing ambient sound into the IEM system can also provide the musician a more fulfilling performance since IEMs are prone to create a feeling of isolation in certain settings.

In certain embodiments, the systems use a short-range communication system such as Bluetooth, Kleer, infrared or Wi-Fi (PAN—Personal Area Network) so that there is no need to connect to sound board or send signal across a distance to allow in-ear voice or instrument monitoring and also no need to use rack space or outboard RF wireless transmitter or antennas to transmit sound to receiver for monitoring a sound mix. This is advantageous in that there is less space taken up by equipment and less tangling of wires on stage and in practice areas.

The DPM systems are also advantageous because there is no need for vocalist or musician worn transmitter body-packs for the musician to receive signal from the mixing board, and then pass it along to monitoring ear pieces.

Currently available wireless monitoring systems include significantly more equipment, for example, use body-pack receivers as well as rack mounted transmitters. The DPM systems described herein are self-contained system, e.g., there are fewer or no additional outboard equipment pieces, which increase expense and negatively impact ease of use. The DPM systems described herein use, for example, direct cord attachment or a short-range communication system. This is advantageous because there is no need to control the monitoring characteristics of one or several sound sources from a sound board or other device that may be remotely located or out of personal reach.

The DPM systems are adapted to be controlled by the individual user and does not necessarily utilize another person to control the monitoring system because it is within reach or, and under the immediate control of the user(s). This allows the users(s) to control the volume of their voice or instrument and all others being monitored in relation to the ambient mix creating a user defined sound mix that includes their monitored voice. This ability to individually control the vocal mix allows for few required individuals for the control of monitoring quality.

Additionally, the DPM system described herein may further comprise several user controls to modulate the sound of their voice or instrument. This could be done, for example, by utilizing a bypass switch and indicator (see, for example FIGS. 2 and 5, 205 and 504) to allow the DPM user, for example, to monitor their voice while not sending signal to the PA. A mute switch (see, for example FIGS. 2, 4, 7 and 8, 206, 505, 805, and 907) allows, for example, a user to mute the monitor system while still sending full signal to the PA.

The DPM systems may also further comprise a compression or gate system to allow, for example, more clear or concise reproduction of the voice while limiting reproduction of other ambient sound that the microphone or instrument may pick up. Any of several effects could also be added to the reproduction of the users voice, through a sound modulating system such as, reverberation, echo, delay, EQ, and the like (see, for example FIGS. 2, 4, and 8, 207, 506 and 908). The sound modulating system could allow the use, for example, to store presets for a series of multi-effect settings that could be recalled rapidly through a standard sound modulating system (e.g. multi-effects system) comprising digital or analog circuitry for processing audio signals. The effects can transform the sound entirely or merely color the sound in a user defined manner. All of these effects could be sent both to the sound board for reproduction by the public address and also to the users ear as part of the DPM system of vocal and instrument monitoring. The sound modulating system could also control the volume of the monitoring devices to achieve the desired level of monitoring for the user.

The DPM system, using a short-range communication system, transmits only a short distance from the vocal capture system (e.g. microphone) because it is either integral with the vocal capture system or located between microphone and cord (FIG. 1, 2 and FIG. 4) remaining near to the user's ear mounted monitoring device (FIG. 3) This is advantageous due to less likelihood of signal interference and lower power consumption. Distances, include, for example, less than one meter, one meter, two meters, three meters, ten meters, 30 meters or any distance in-between. This allows, for example, for lower power usage and increased signal transmission levels and clarity thereby reducing distortion or interference common in systems that transmit analog or digital signals over longer distances. The short transmission distance would also alleviate the difficulty finding usable frequency due to interference from other nearby devices. Moreover, there would also be no need for lengthy, cumbersome and fragile radio-frequency antennas.

The DPM system would also allow, for example, the user to very clearly hear what the microphone is sending to the soundboard or public address system. The DPM system would allow the user to more accurately monitor and maintain their intended pitch, volume, timbre, clarity and quality. Another advantage of the systems and method described herein include, direct monitoring at user adjusted volumes resulting in less vocal strain and therefore more vocal stamina.

As compared to traditional vocal and instrument monitoring, the DPM system would allow higher levels of personal monitoring volume before feedback. Traditional vocal and instrument monitoring includes primarily wedge shaped speaker boxes placed on the floor in front of the vocalist or musician, or side-fill monitors on the side of the stage pointing inward toward the vocalist. These monitors successfully reproduce voice, instrument and other sound as desired by the vocalist or musician.

However, with the increase in ambient sound from these monitors, stage volume increase markedly. With increased stage volumes, feedback problems are created as well as microphone bleed. Feedback occurs when a microphone is picking up sound from a nearby speaker that is also being used to amplify sound from the same microphone. The squeeling sound is annoying to musicians and listeners alike, is highly disruptive to music performance. It can even cause serious hearing damage for musicians and audience members alike. Since the DPM system is closed, there is no risk of feedback, and the user can increase their own vocal and instrument monitoring level far beyond what is possible with traditional vocal monitors. Also, lower ambient sound from using the DPM system could result in a lower likelihood of long-term hearing damage.

The closed system also allows for lower ambient musical and vocal performance levels leading to less microphone bleed. Microphone bleed is the leakage of one audio source's output into another audio source's input. This can happen onstage, such as one vocalists monitor bleeding into another vocalist's microphone. This result of microphone bleed is difficulties in retaining clarity and overall sound quality in the public address sound reproduction system. The DPM system would allow ambient sound levels to remain relatively low resulting in less microphone bleed.

Another advantage of the DPM system is its simplicity and compact, efficient nature. With the DPM systems described herein there is little or no need for additional monitoring speakers on stage to monitor vocals, which traditionally include wedge, side fill, and microphone-stand mounted categories. Traditional monitors all require external power sources and connecting cables. Using the DPM systems described herein, thus results in drastically lower power consumption and ease of set-up. Also, traditional monitors by nature of their magnet powered speakers and wooden cabinet construction are heavy and difficult to transport. Moreover, the traditional monitors take up significant and valuable floor space. As opposed to traditional systems, the DPM system is compact, portable, energy efficient and lightweight.

The DPM systems described herein could, for example, be used to directly monitor more than one source. Vocalists could utilize the system modified to transmit from and also receive signal from several source microphones to hear themselves and each other directly from the transmitter integral with the vocal capture system or located between microphone and cord. This could be done, for example, by having the monitoring device tuned to receive signals from multiple transmitters (e.g. barber-shop quartet, A Cappella group). The result would be less sound production equipment and more effective monitoring for all members of a band or vocal group.

The DPM system described in herein could, for example, utilize a central receiver device which will receive wireless signals from multiple transmitters and can generate multiple individual user defined mixes to be transmitted to individual monitoring devices, thereby sending user defined mixes to each linked transmitter. The central receiver device could store and recall mix settings based upon a series of user defined presets.

Microphone Mounted Transmitter

Figure 2:
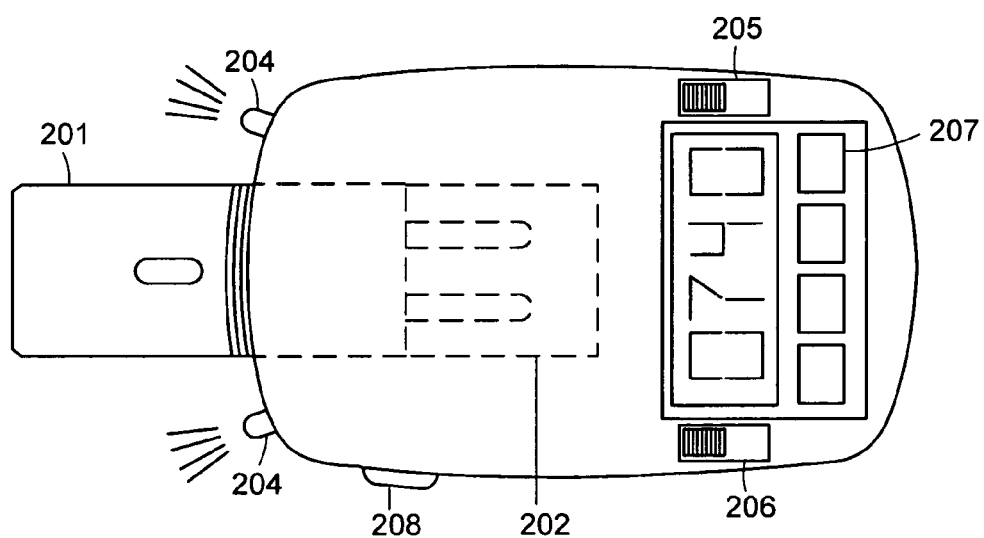
FIG. 2 shows a top view signal conversion, separation and transmission apparatus.

In reference to FIGS. 1 and 2, a short-range communication system (e.g., a digital or analog signal conversion and transmission apparatus) is connected via cable connections (for example, XLR cable) (101 and 102) located between microphone and cord. The apparatus splits or duplicates the signal coming from the microphone and sends signal A as an analog or digital signal through the cable to the mixing board or other sound reinforcement equipment such as an amplifier and public address system (PA). Signal B is converted to a format that can be transmitted wirelessly such as digital or analog to be transmitted by a short-range communication system such as Bluetooth, Infrared, radio frequency or other wireless transmission protocol via a transmitter. The wireless transmission is received by one or more monitoring devices (FIG. 3 and FIG. 5) utilizing the corresponding wireless transmission protocol and is converted into a format that can be reproduced as audio signal by the user's receiving device. To reproduce the audio signal, the monitoring devices receiving device would include an ear or head mounted speaker apparatus (FIG. 3) which could comprise one or more headphones, earpieces, headset, earbuds, or earphones. The monitoring devices could also include a body mounted apparatus (FIG. 5) and headphones, earpieces, headset, earbuds, or earphones to reproduce the sound for the DPM user.

The conversion and transmission apparatus (FIG. 1 and FIG. 2) may further comprise a bypass switch (205) and a mute switch (206) and status indicator lights. The apparatus is powered by one of the common well known methods such as single use or rechargeable batteries (203) of type AA, AAA, C, 9 v or any other battery type such as those used in watches. Moreover the apparatus could contain a rechargeable power cell (203) that will recharge itself when connected to a standard battery recharging unit. The apparatus could also utilize what is commonly known as Phantom Power, which is an inherent power provision feature available to devices using XLR cables. The conversion and transmission apparatus (FIG. 1 and FIG. 2) shall further include an indicator light (204) to monitor available power levels.

The conversion and transmission apparatus (FIG. 1 and FIG. 2) could also include its own sound reproduction system allowing the DPM user to easily plug headphones, earpieces, headset, earbuds, or earphones directly into the conversion and transmission apparatus (105 and 208). This would be the simplest and least expensive DPM method as no wireless transmission technology would be necessary.

The conversion and transmission apparatus (FIG. 1 and FIG. 2) could also include, for example, a sound modulating system (e.g. multi-effects system)(207) allowing inclusion to the vocal signal one or more of several effects could also be added to the reproduction of the users voice such as reverb, echo, delay, EQ, and others (207 and 506). The sound modulating system (e.g. multi-effects system) could store presets for a series of multi-effect settings which could be recalled rapidly through a standard sound modulating system (e.g. multi-effects system) comprising of digital or analog circuitry for processing audio signals. All of these effects could be sent both to the sound board for reproduction by the public address and also to the users ear as part of the DPM system of vocal and instrument monitoring. The sound modulating system could also control the volume of the monitoring devices to achieve the desired level of monitoring for the user.

Wired Microphone Incorporating Transmitter for DPM Monitoring System

Figure 3:
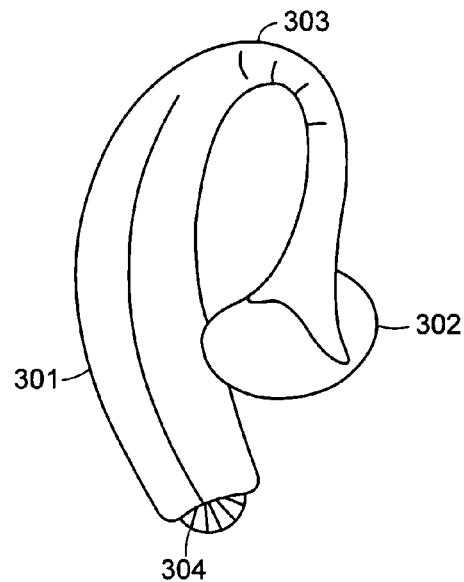
FIG. 3 shows a side view signal receiving and sound generation apparatus.
Figure 4:
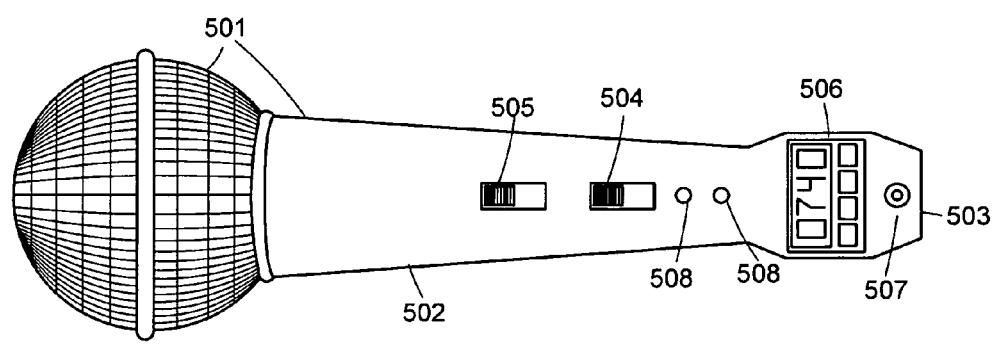
FIG. 4 shows a wired or wireless microphone.

In reference to FIG. 4, a conversion and transmission apparatus is integral with the vocal capture system (e.g. incorporated into the microphone housing) (501). The apparatus splits the microphone signal passing along signal A as an analog signal through the microphone connected XLR cable to the mixing board or sound reinforcement equipment such as an amplifier and public address system (PA). Signal B is converted to a format that can be transmitted wirelessly such as digital or analog to be transmitted by a short-range communication system such as Bluetooth, Infrared, radio frequency or other wireless transmission protocol. The wireless transmission is received by one or more monitoring devices (FIG. 3) utilizing the corresponding wireless transmission protocol and is converted into a format that can be reproduced as audio signal by the user's receiving device. To reproduce the signal, one or more monitoring devices would include an ear or head mounted speaker apparatus (FIG. 3) which could comprise one or more headphones, earpieces, headset, earbuds, or earphones. The one or more monitoring devices could also include a body mounted apparatus (FIG. 5) and headphones, earpieces, headset, earbuds, or earphones to reproduce the sound for the DPM user. The conversion and transmission apparatus integral with the vocal capture system (e.g. incorporated into microphone) (FIG. 4) shall further include indicator lights for on or off, mute, bypass, and low battery (508) to monitor current functions. The conversion and transmission apparatus integral with the vocal capture system (e.g. incorporated into microphone) (FIG. 4) shall further include a bypass switch (504) and a mute switch (505).

The conversion and transmission apparatus integral with the vocal capture system (e.g. incorporated into microphone) is powered, for example, by one of the common well known methods such as single use or rechargeable batteries of type AA, AAA, C, 9 v or any other battery type such as those used in watches. Moreover the apparatus could contain a rechargeable power cell that will recharge itself when connected to a standard battery recharging unit. The apparatus could also utilize what is commonly know as Phantom Power, which is an inherent power provision feature available to devices using XLR cables.

The conversion and transmission apparatus integral with the vocal capture system (e.g. incorporated into microphone) (FIG. 4) could also include its own sound reproduction system allowing the DPM user to easily plug one or more monitoring devices such as headphones, earpieces, headset, earbuds, or earphones into the transmission apparatus (507). This would be the simplest and least expensive DPM method as no wireless transmission technology would be necessary to operate the DPM system.

The conversion and transmission apparatus integral with the vocal capture system (e.g. incorporated into microphone) (FIG. 4) could also include a sound modulating system (e.g. a multi-effects system) (506) allowing inclusion to the vocal signal one or more of several effects could also be added to the reproduction of the users voice such as reverb, echo, delay, EQ, and others (506). The sound modulating system (e.g. multi-effects system) could store presets for a series of multi-effect settings which could be recalled rapidly through a standard sound modulating system (e.g. multi-effects system) comprising of digital or analog circuitry for processing audio signals. All of these effects could be sent both to the sound board for reproduction by the public address and also to the users ear as part of the DPM system of vocal and instrument monitoring. The sound modulating system could also control the volume of the monitoring devices to achieve the desired level of monitoring for the user.

"Sound modulation system, effects units and multi-effects system," as used herein refer, for example to devices that affect the sound of an electric instrument or other audio source (such as recorded material) when plugged in to the electrical signal path the instrument or source sends, most often an electric guitar or bass guitar. They can also be used on other instruments or sound sources, like the Rhodes piano, synths or even the human voice. While some effect units transform the sound completely, others merely color the sound in a minor way.

A sound modulating system comprise, for example, one or more electronic devices which may contain analog or digital circuitry for processing audio signals, similar to that found in music synthesizers, for example active and passive filters, envelope followers, voltage-controlled oscillators, or digital delays.

In certain embodiments, the invention uses a "central controller". As used herein, the central controller is a device that can receive, mix and/or transmit an audio signal as so required by the user.

Wireless Microphone Incorporating Transmitter

In one embodiment, a conversion and transmission apparatus integral with the vocal capture system (e.g., incorporated into microphone) (FIG. 4). The apparatus splits the microphone signal transmitting signal A as an analog or digital signal wirelessly to the mixing board of sound reinforcement equipment such as an amplifier and public address system (PA). Signal B is converted to a format that can be transmitted wirelessly such as digital or analog to be transmitted by a short-range communication system such as Bluetooth, Infrared, radio frequency or other wireless transmission protocol. The wireless transmission is received by a device (FIG. 3 and FIG. 5) utilizing the corresponding wireless transmission protocol and is converted into a format that can be reproduced as audio signal by the user's receiving device. To reproduce the audio signal, the receiving device would include one or more ear or head mounted speaker apparatus (302) which could comprise, for example, headphones, earpieces, headset, earbuds, or earphones. The receiving device could also include a body mounted apparatus (FIG. 5) and headphones, earpieces, headset, earbuds, or earphones to reproduce the sound for the DPM user. The conversion and transmission apparatus integral with the vocal capture system (e.g. incorporated into microphone) (FIG. 4) shall further include indicator lights for on or off, mute, bypass, and low battery (508) to monitor current functions and power levels. The microphone based conversion and transmission apparatus (FIG. 4) shall further include a bypass switch (504) and a mute switch (505). The conversion and transmission apparatus integral with the vocal capture system (e.g. incorporated into microphone) (FIG. 4) shall further include indicator lights for on or off, mute, bypass, and low battery (508) to monitor current functions The conversion and transmission apparatus integral with the vocal capture system (e.g. incorporated into microphone) is powered by one of the common well known methods such as single use or rechargeable batteries of type AA, AAA, C, 9 v or any other battery type such as those used in watches. Moreover the apparatus could contain a rechargeable power cell that will recharge itself when connected to a standard battery recharging unit.

The conversion and transmission apparatus integral with the vocal capture system (e.g., incorporated into microphone) (FIG. 4) could also include its own sound reproduction system allowing the DPM user to easily plug headphones, earpieces, headset, earbuds, or earphones into the transmission apparatus (507). This would be the simplest and least expensive DPM method as no wireless transmission technology would be necessary to operate the DPM system.

The conversion and transmission apparatus integral with the vocal capture system (e.g., incorporated into microphone) (FIG. 4) could also include a sound modulating system (e.g., multi-effects system) (506) allowing inclusion to the vocal signal one or more of several effects could also be added to the reproduction of the users voice such as reverb, echo, delay, EQ, and others (506). The sound modulating system could store presets for a series of multi-effect settings which could be recalled rapidly through a standard sound modulating system (e.g., multi-effects system) comprising of digital or analog circuitry for processing audio signals. All of these effects could be sent both to the sound board for reproduction by the public address and also to the users ear as part of the DPM system of vocal and instrument monitoring. The sound modulating system could also control the volume of the monitoring devices to achieve the desired level of monitoring for the user.

Wireless Microphone Headset Unit with Self Monitoring Function

Figure 6:
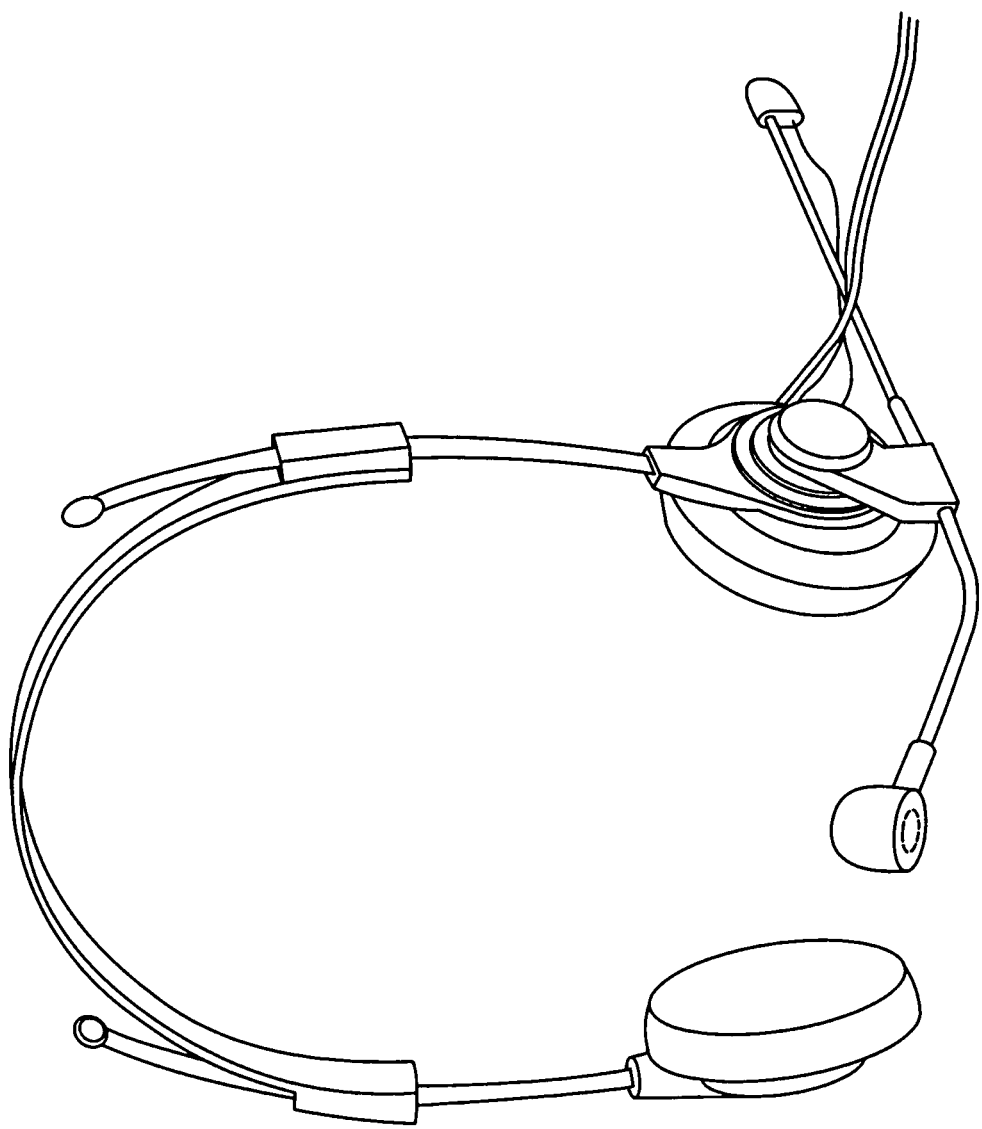
FIG. 6 shows a head mounted embodiment.

In one exemplary embodiment, shown for example in FIG. 6, the DPM system is used in head or body mounted wired or wireless such as a lavaliere or microphone headset unit. The microphone apparatus includes direct self monitoring by relaying the users voice to one or more incorporated headphones, earpieces, headset, earbuds, or earphones.

This embodiment could also include a sound modulating system (e.g., multi-effects system) allowing inclusion to the vocal signal one or more of several effects could also be added to the reproduction of the users voice such as reverb, echo, delay, EQ, and others. The sound modulating system could store presets for a series of multi-effect settings, which could be recalled rapidly through a standard sound modulating system (e.g., multi-effects system) comprising of digital or analog circuitry for processing audio signals. All of these effects could be sent both to the sound board for reproduction by the public address and also to the users ear as part of the DPM system of vocal and instrument monitoring. The sound modulating system could also control the volume of the monitoring devices to achieve the desired level of monitoring for the user.

Clip-on Microphone Monitoring Device

In one embodiment, a conversion and transmission apparatus including a small microphone (FIG. 7) is connected to an instrument to be monitored by the user or others by one of many commonly used connection devices (fastener, clamp, clip, or other connecting system) (804) The instrument fastened microphone, conversion and transmission apparatus includes a small microphone (803) and an adjustable and flexible "gooseneck" (807) for positioning the microphone. The microphone signal is converted to a format that can be transmitted wirelessly such as digital or analog to be transmitted by a short-range communication system such as Bluetooth, Infrared, radio frequency or other wireless transmission protocol. The wireless transmission is received by a device (FIG. 3 and FIG. 5) utilizing the corresponding wireless transmission protocol and is converted into a format that can be reproduced as audio signal by the user's receiving device. To reproduce the audio signal, the receiving device would include one or more ear or head mounted speaker apparatus (FIG. 3) which could comprise, for example, headphones, earpieces, headset, earbuds, or earphones. The receiving device could also include a body mounted apparatus (FIG. 5) and headphones, earpieces, headset, earbuds, or earphones to reproduce the sound for the DPM user. An instrument can be any device constructed or modified to make sound or music. The instrument fastened microphone, conversion and transmission apparatus (FIG. 7) shall further include indicator lights for on or off, mute, bypass, and low battery (802) to monitor current functions and power levels. The instrument fastened microphone, conversion and transmission apparatus (FIG. 7) shall further include a bypass switch (805) and a mute switch (805).

The instrument fastened microphone, conversion and transmission apparatus (FIG. 7) is powered by one of the common well known methods such as single use or rechargeable batteries of type AA, AAA, C, 9 v or any other battery type such as those used in watches (801). Moreover the apparatus could contain a rechargeable power cell that will recharge itself when connected to a standard battery recharging unit (801).

The instrument fastened microphone, conversion and transmission apparatus (FIG. 7) could also include its own sound reproduction system allowing the DPM user to easily plug headphones, earpieces, headset, earbuds, or earphones into the transmission apparatus (806). This would be the simplest and least expensive DPM method as no wireless transmission technology would be necessary to operate the DPM system.

The instrument fastened microphone, conversion and transmission apparatus (FIG. 7) could also include a sound modulating system (e.g., multi-effects system) allowing inclusion to the vocal signal one or more of several effects could also be added to the reproduction of the users voice such as reverb, echo, delay, EQ, and others. The sound modulating system could store presets for a series of multi-effect settings which could be recalled rapidly through a standard sound modulating system (e.g., multi-effects system) comprising of digital or analog circuitry for processing audio signals. The sound modulating system could also control the volume of the monitoring devices to achieve the desired level of monitoring for the user.

Instrument Linked Monitoring Device

In one embodiment, a conversion and transmission apparatus is connected to an instrument by direct cable connection including but not limited to ¼ inch, ⅛ inch, midi, or USB. (FIG. 8) The apparatus shall include a direct cable connection to an instrument (902) which could include a pivot mechanism (909) allowing the user to alter the connection angle. The apparatus splits the instrument signal transmitting signal A as an analog or digital signal wirelessly to the mixing board of sound reinforcement equipment such as an amplifier and public address system (PA) through direct cable connection (901). Signal B is converted to a format that can be transmitted wirelessly such as digital or analog to be transmitted by a short-range communication system such as Bluetooth, Infrared, radio frequency or other wireless transmission protocol. The wireless transmission is received by a device (FIG. 3 and FIG. 5) utilizing the corresponding wireless transmission protocol and is converted into a format that can be reproduced as audio signal by the user's receiving device. To reproduce the audio signal, the receiving device would include one or more ear or head mounted speaker apparatus (FIG. 3) which could comprise, for example, headphones, earpieces, headset, earbuds, or earphones. The receiving device could also include a body mounted apparatus (FIG. 5) and headphones, earpieces, headset, earbuds, or earphones to reproduce the sound for the DPM user. An instrument can be any device constructed or modified to make sound or music. The instrument linked conversion and transmission apparatus (connected by a cable) (FIG. 8) shall further include indicator lights for on or off, mute, bypass, and low battery (904) to monitor current functions and power levels. The instrument linked conversion and transmission apparatus (FIG. 8) shall further include a bypass switch (906) and a mute switch (907).

The instrument linked conversion and transmission apparatus (connected by a cable) is powered by one of the common well known methods such as single use or rechargeable batteries of type AA, AAA, C, 9 v or any other battery type such as those used in watches (903). Moreover the apparatus could contain a rechargeable power cell that will recharge itself when connected to a standard battery recharging unit.

The instrument linked conversion and transmission apparatus (connected by a cable)(FIG. 8) could also include its own sound reproduction system allowing the DPM user to easily plug headphones, earpieces, headset, earbuds, or earphones into the transmission apparatus (905). This would be the simplest and least expensive DPM method as no wireless transmission technology would be necessary to operate the DPM system.

The instrument linked conversion and transmission apparatus (connected by a cable)(FIG. 8) could also include a sound modulating system (e.g., multi-effects system) (908) allowing inclusion to the vocal signal one or more of several effects could also be added to the reproduction of the users voice such as reverb, echo, delay, EQ, and others. The sound modulating system could store presets for a series of multi-effect settings which could be recalled rapidly through a standard sound modulating system (e.g., multi-effects system) comprising of digital or analog circuitry for processing audio signals. All of these effects could be sent both to the sound board for reproduction by the public address and also to the users ear as part of the DPM system of vocal and instrument monitoring. The sound modulating system could also control the volume of the monitoring devices to achieve the desired level of monitoring for the user.

Central Mixer Based Multi-Device Monitoring System

Figure 5:
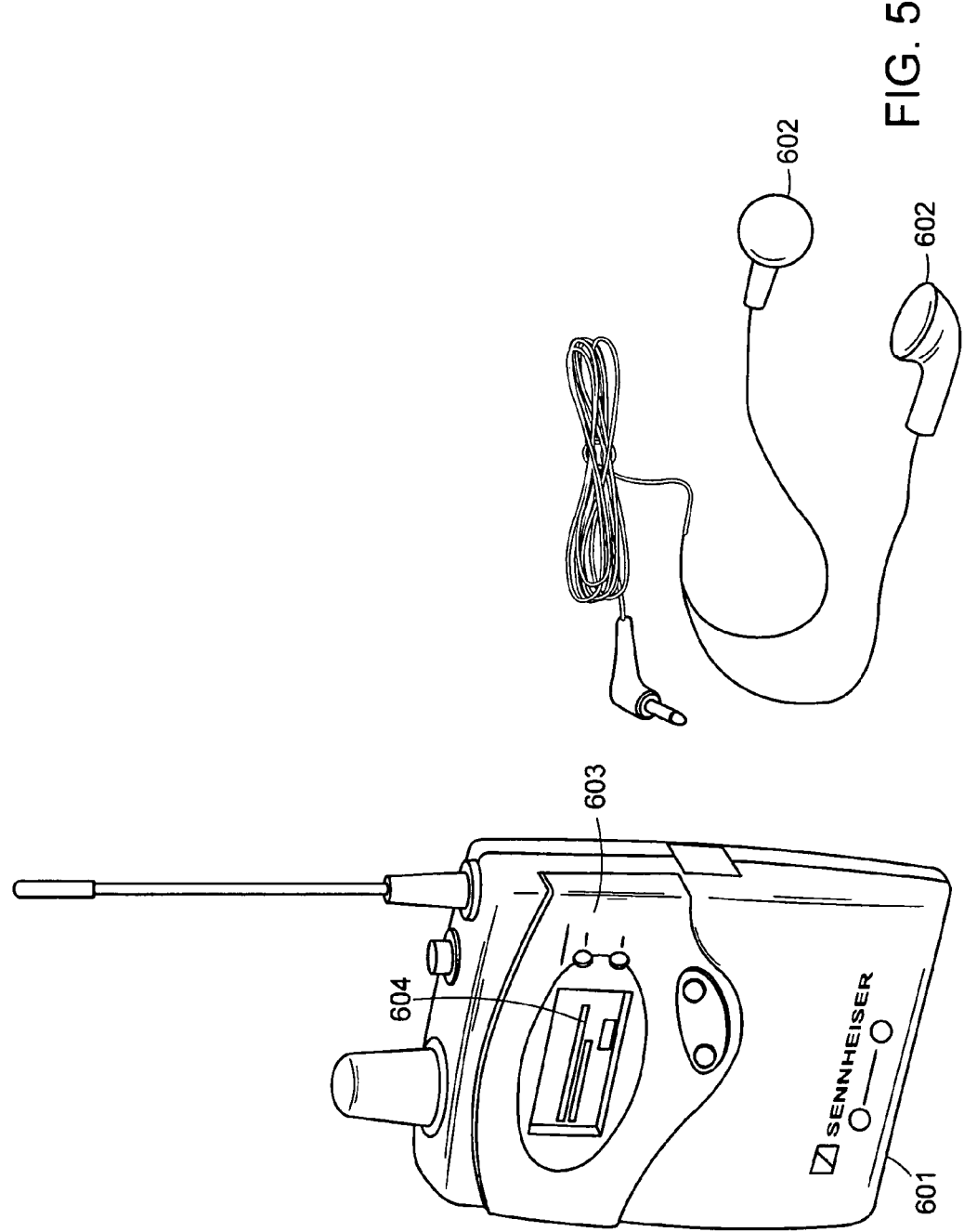
FIG. 5 shows a body-mounted receiver embodiment.

In one embodiment, a receiver device (1001) receives multiple DPM signals from the one or more transmitter devices disclosed herein (FIG. 9) and can generate user defined sound mixes from each of the received signals to be transmitted to one or more user-worn monitoring devices (FIG. 3, FIG. 5 and 1005). The DPM system described in herein could, for example, be utilize a central receiver device (1001) which will receive wireless signals from multiple transmitters (1004) and can generate multiple individual user defined mixes to be transmitted to user-worn monitoring devices (FIG. 3, FIG. 5 and 1005). By way of a transmitter system incorporated therein, the central receiver device (1001) could send the user defined sound mixes to each of several individual user worn monitoring devices (FIG. 3, FIG. 5 and 1005). This system would allow several musicians to define and control their individual monitoring mix through transmitters connected to their instruments or microphones (FIGS. 1, 2, 4, 7, 8 and 1004) with the sound mix processed by the central receiver device and the custom designed sound mix received by the user-worn monitoring devices (FIG. 3 and FIG. 5). The sound mix could include any combination and level of instruments and microphones sending signals to the central receiver device (1001). The central receiver device (1001) could utilize traditional sound processing equipment including faders and rotary knob adjustments of sound parameters. The central receiving device (1001) could allow for storage and recall sound mix settings based upon a series of user defined presets. The sound processing central receiver device (1001) could utilize a digital processing system utilizing a visual screen display of sound modulation parameters that can be altered in user defined ways by touch sensitive surfaces. This digital processing system would allow for storage and recall of sound mix settings based upon a series of user defined presets. The sound processing central receiver device (1001) could utilize a digital processing system allowing sound modulating effects to be applied to each individual sound source including but not limited to reverberation, delay, volume, sound cancelling, compression, limiting, gating, pitch shift and correction, harmonies, thickening or doubling, chorus, flange, phase, or equalization (EQ).

Hearing Impairment

In one embodiment, the DPM is designed for use by the hearing impaired. For example, an earpiece mounted voice microphone and speaker system allowing the hearing impaired user to monitor their own voice at higher than ambient levels and thereby better enunciate and pronounce their speech, resulting in more effective communication.

Short-Range Wireless Communication

Bluetooth

Bluetooth wireless technology is a short-range communications technology intended to replace the cables connecting portable and/or fixed devices while maintaining high levels of security. The key features of Bluetooth technology are robustness, low power, and low cost. The Bluetooth specification defines a uniform structure for a wide range of devices to connect and communicate with each other.

Bluetooth technology has achieved global acceptance such that any Bluetooth enabled device, almost everywhere in the world, can connect to other Bluetooth enabled devices in proximity. Bluetooth enabled electronic devices connect and communicate wirelessly through short-range, ad hoc networks known as piconets. Each device can simultaneously communicate with up to seven other devices within a single piconet. Each device can also belong to several piconets simultaneously. Piconets are established dynamicrophoneally and automatically as Bluetooth enabled devices enter and leave radio proximity.

A fundamental Bluetooth wireless technology strength is the ability to simultaneously handle both data and voice transmissions. This enables users to enjoy variety of innovative solutions such as a hands-free headset for voice calls, printing and fax capabilities, and synchronizing PDA, laptop, and mobile phone applications to name a few.

Range

The operating range depends on the device class, e.g., class 3 radios—have a range of up to 1 meter or 3 feet; Class 2 radios—most commonly found in mobile devices—have a range of 10 meters or 30 feet; Class 1 radios—used primarily in industrial use cases—have a range of 100 meters or 300 feet.

The Bluetooth RF (physical layer) operates in the unlicensed ISM band at 2.4 GHz. The system employs a frequency hop transceiver to combat interference and fading, and provides many FHSS carriers. RF operation uses a shaped, binary frequency modulation to minimize transceiver complexity. The symbol rate is 1 Megasymbol per second (Msps) supporting the bit rate of 1 Megabit per second (Mbps) or, with Enhanced Data Rate, a gross air bit rate of 2 or 3 Mb/s. These modes are known as Basic Rate and Enhanced Data Rate respectively.

During operation, a physical radio channel is shared by a group of devices that are synchronized to a common clock and frequency hopping pattern. One device provides the synchronization reference and is known as the master. All other devices are known as slaves. A group of devices synchronized in this fashion form a piconet. This is the fundamental form of communication for Bluetooth wireless technology.

Devices in a piconet use a specific frequency hopping pattern which is algorithmicrophoneally determined by certain fields in the Bluetooth specification address and clock of the master. The basic hopping pattern is a pseudo-random ordering of the 79 frequencies in the ISM band. The hopping pattern may be adapted to exclude a portion of the frequencies that are used by interfering devices. The adaptive hopping technique improves Bluetooth technology co-existence with static (non-hopping) ISM systems when these are co-located.

The physical channel is sub-divided into time units known as slots. Data is transmitted between Bluetooth enabled devices in packets that are positioned in these slots. When circumstances permit, a number of consecutive slots may be allocated to a single packet. Frequency hopping takes place between the transmission or reception of packets. Bluetooth technology provides the effect of full duplex transmission through the use of a time-division duplex (TDD) scheme.

Above the physical channel there is a layering of links and channels and associated control protocols. The hierarchy of channels and links from the physical channel upwards is physical channel, physical link, logical transport, logical link and L2CAP channel.

Within a physical channel, a physical link is formed between any two devices that transmit packets in either direction between them. In a piconet physical channel there are restrictions on which devices may form a physical link. There is a physical link between each slave and the master. Physical links are not formed directly between the slaves in a piconet.

The physical link is used as a transport for one or more logical links that support unicast synchronous, asynchronous and isochronous traffic, and broadcast traffic. Traffic on logical links is multiplexed onto the physical link by occupying slots assigned by a scheduling function in the resource manager.

A control protocol for the baseband and physical layers is carried over logical links in addition to user data. This is the link manager protocol (LMP). Devices that are active in a piconet have a default asynchronous connection-oriented logical transport that is used to transport the LMP protocol signaling. For historical reasons this is known as the ACL logical transport. The default ACL logical transport is the one that is created whenever a device joins a piconet. Additional logical transports may be created to transport synchronous data streams when this is required.

The link manager function uses LMP to control the operation of devices in the piconet and provide services to manage the lower architectural layers (radio layer and baseband layer). The LMP protocol is only carried on the default ACL logical transport and the default broadcast logical transport.

Above the baseband layer the L2CAP layer provides a channel-based abstraction to applications and services. It carries out segmentation and reassembly of application data and multiplexing and de-multiplexing of multiple channels over a shared logical link. L2CAP has a protocol control channel that is carried over the default ACL logical transport. Application data submitted to the L2CAP protocol may be carried on any logical link that supports the L2CAP protocol.

Infrared Communication (IR) IR data base communication may be employed in the systems described herein. These devices may conform to standards published by IrDA, the Infrared Data Association. Remote controls and IrDA devices use infrared light-emitting diodes (LEDs) to emit infrared radiation which is focused by a plastic lens into a narrow beam. The beam is modulated, e.g. switched on and off, to encode the data. The receiver uses a silicon photodiode to convert the infrared radiation to an electric current. It responds only to the rapidly pulsing signal created by the transmitter, and filters out slowly changing infrared radiation from ambient light. Infrared communications are useful for indoor use in areas of high population density. IR does not penetrate walls and so does not interfere with other devices in adjoining rooms. Infrared is the most common way for remote controls to command appliances. Free space optical communication using infrared lasers can be a relatively inexpensive way to install a communications link in an urban area operating at up to 4 gigabit/s, compared to the cost of burying fiber optic cable. Infrared lasers are used to provide the light for optical fiber communications systems. Infrared light with a wavelength around 1,330 nm (least dispersion) or 1,550 nm (best transmission) are the best choices for standard silica fibers.

IR is useful in the systems, devices and methods describe herein, for example, because IrDA is inexpensive, IrDA is FAST (up to 16 mbps and soon to increase from 100 to 500 mbps), IrDA enabled devices consume less power (minimal drain of the batteries of the devices), and IrDA Data is secure. Data being transmitted via infrared is very difficult to intercept or hack because it is directional (you choose where to send it). Data is safe because it cannot go through walls or objects and virtually eliminates eavesdropping by un-welcomed recipients. Perfect for applications where wireless payment transfers are needed. Such as buying a soda out of a vending machine, or paying for something in a retail (restaurants and stores) or mobile environment (e.g. toll booths). In addition, IrDA is safe, there is no harm to the eye as long as it is used correctly. IrDA requires conscious, deliberate connection and control, IrDA has Point to point, Peer-to-Peer range. In addition, IrDA is ubiquitous, e.g., it is globally adopted and implemented in over ½ billion products throughout the world. This is advantageous also because IrDA standards are non-proprietary. Other advantageous, include, for example, IrDA has no radio frequency interference issues or signal conflicts, IrDA provides much improved security when used in financial applications.

Radio frequency (RF) is a frequency or rate of oscillation within the range of about 3 kHz to 300 GHz. This range corresponds to frequency of alternating current electrical signals used to produce and detect radio waves. Since most of this range is beyond the vibration rate that most mechanical systems can respond to, RF usually refers to oscillations in electrical circuits or electromagnetic radiation.

Ultra high frequency (UHF) designates a range (band) of electromagnetic waves with frequencies between 300 MHz and 3 GHz (3,000 MHz). Also known as the decimeter band or decimeter wave as the wavelengths range from ten to one decimeters. Radio waves with frequencies above the UHF band fall into the SHF (Super high frequency) and EHF (Extremely high frequency) bands; all of which fall into the Microwave frequency range. Lower frequency signals fall into the VHF or lower bands. See electromagnetic spectrum for a full listing of frequency bands.

UHF and VHF are the most commonly used frequency bands for transmission of television signals. Modern mobile phones also transmit and receive within the UHF spectrum. UHF is widely used by public service agencies for two-way radio communication, usually using narrowband frequency modulation, but digital services are on the rise. There has traditionally been very little radio broadcasting in this band until recently; see digital audio broadcasting for details. The Global Positioning System also uses UHF.

One uncommon use of UHF waves is for the detection of partial discharges. Partial discharges occur because of the sharp geometries created in high voltage insulated equipment. The advantage of UHF detection is that this method can be used to localize the source of the discharge. A drawback to UHF detection is the extreme sensitivity to external noise. UHF detection methods are used in the field, especially for large distribution transformers.

2.45 GHz, now mainly used for WiFi, Bluetooth and US cordless phones has been proposed for Wireless energy transfer. Some pilot experiments have been performed, but it is not used on a large scale.

Very high frequency (VHF) is the radio frequency range from 30 MHz to 300 MHz. It is also known as the meter band or meter wave as the wavelengths range from ten to one meters. Frequencies immediately below VHF are denoted HF, and the next higher frequencies are known as Ultra high frequency (UHF).

Common uses for VHF are FM radio broadcast at 88-108 MHz and television broadcast (together with UHF). VHF is also commonly used for terrestrial navigation systems (VOR in particular), marine communications, and aircraft communications.

VHF frequencies' propagation characteristics are ideal for short-distance terrestrial communication, with a range generally somewhat farther than line-of-sight from the transmitter (see formula below). Unlike high frequencies (HF), the ionosphere does not usually reflect VHF radio and thus transmissions are restricted to the local area (and don't interfere with transmissions thousands of kilometers away). VHF is also less affected by atmospheric noise and interference from electrical equipment than low frequencies. Whilst it is more easily blocked by land features than HF and lower frequencies, it is less bothered by buildings and other less substantial objects than higher frequencies.

Two unusual propagation conditions can allow much farther range than normal. The first, tropospheric ducting, can occur in front of and parallel to an advancing cold weather front, especially if there is a marked difference in humidities between the cold and warm air masses. A duct can form approximately 250 km (155 mi) in advance of the cold front, much like a ventilation duct in a building, and VHF radio frequencies can travel along inside the duct, bending or refracting, for hundreds of kilometers. For example, a 50 watt Amateur FM transmitter at 146 MHz can talk from Chicago, to Joplin, Mo., directly, and to Austin, Tex., through a repeater. In a July 2006 incident, a NOAA Weather Radio transmitter in north central Wisconsin was blocking out local transmitters in west central Michigan, quite far out of its normal range. The second type, much more rare, is called Sporadic E, referring to the E-layer of the ionosphere. A sunspot eruption can pelt the Earth's upper atmosphere with charged particles, which may allow the formation of an ionized "patch" dense enough to reflect back VHF frequencies the same way HF frequencies are usually reflected (skywave). For example, KMID (TV Channel 2; 54-60 MHz) from Midland, Tex. was seen around Chicago, pushing out Chicago's WBBM-TV. These patches may last for seconds, or extend into hours. FM stations from Miami, Fla.; New Orleans, La.; Houston, Tex. and even Mexico were heard for hours in central Illinois during one such event. Mid summer 2006 central Iowa stations were heard in Columbus, Nebr. and blocking out Omaha radio and TV stations for several days.

The large technically and commercially valuable slice of the VHF spectrum taken up by television transmission has attracted the attention of many companies and governments recently, with the development of more efficient digital television broadcasting standards. In some countries much of this spectrum will likely become available (probably for sale) in the next decade or so (currently scheduled for 2009 in the United States).

Kleer

Kleer's patented sub-sampling radio architecture delivers excellent radio performance at a fraction of the power consumption of other radio architectures. The enables OEMs to integrate wireless technology into portable audio players without suffering a large penalty in battery life. And OEMs can introduce new small form factor products knowing that small batteries will still give them acceptable battery life.

Kleer's 2.37 MB/s peak bit rate is able to carry full CD-quality stereo audio without resorting to lossy compression techniques that degrade the audio. Kleer has unprecedented immunity to interference in the increasingly crowded 2.4 GHz ISM band. The 2.37 Mb/s peak data rate provides plenty of bandwidth for the retransmission of corrupted data. And the availability of 16 channels in the 2.4 GHz band along with extremely fast channel switching means we can adapt to interference conditions before there is an audible effect.

Kleer's ultra low power consumption facilitates compact form factor. Low power consumption means that smaller batteries can be used while still achieving acceptable battery life and in small form factor consumer electronics such as wireless earphones, the physical size is largely driven by the size of the battery.

Kleer's Listen In™ technology enables users to share the listening experience by having multiple wireless earphones, headphones or speakers listening simultaneously to the same audio source.

Kleer's highly effective ISM band coexistence and use of lossless compression minimizes the required amount of audio buffering, enabling Kleer-based solutions to address latency sensitive applications such as televisions and portable DVD players.

Products based on Kleer's technology are fully interoperable. This enables the same set of earphones or headphones to be used in portable, home and automotive applications. Similarly, the same portable digital audio player can drive earphones, wireless headphones or wireless speakers.

Phantom Power

Phantom power (labeled as +48V on some audio equipment) is a method that sends an electrical current through microphone cables. It is best known as a common power source for condenser microphones, though many active DI boxes also use it.

Phantom power supplies are often built into mixing desks, microphone preamplifiers and similar equipment. In addition to powering the circuitry of a microphone, in traditional (DC-polarized) condenser microphones the phantom powering directly or indirectly supplies the voltage used for polarizing the microphone's transducer element ("capsule").

Phantom powering comprising direct current applied equally through the two signal lines of a balanced audio connector (in modern equipment, usually an XLR connector). The supply voltage is referenced to the ground pin of the connector (=pin 1 of an XLR), which normally is connected to the cable shield and/or a ground wire in the cable. Thus the same type of balanced, shielded microphone cable which studios already used for dynamicrophone microphones could also be used for condenser microphones—in contrast to vacuum-tube microphones, which had required special, multi-conductor cables of various kinds.

In reference to FIG. 1, a side view a short-range communication system is shown consisting of a signal conversion, separation and transmission apparatus. The short-range communication system is located between microphone and cord and is attached by XLR or other connection to the vocal capture system (101) and the cord connection (102) that will send signal to sound board or other sound reinforcement system such as a public address system. The short-range communication system will include a power supply source (103) and status indicators for on or off, mute, and low battery (104). To allow direct monitoring by wired transmission, FIG. 1 shows an ⅛ inch input (105) for wire connected headphones, earpieces, headset, earbuds, or earphones.

101. XLR cable connection to microphone.
102. XLR cable connection to cable/cord with signal to sound reinforcement system (PA).
103. Power supply (single use or rechargeable battery (AA or AAA) or rechargeable power cell).
104. Power on/off/mute/low battery indicator.
105. ⅛ inch output for ear-buds or ear-phones.

In reference to FIG. 2, a top view of a short-range communication system is shown consisting of a signal conversion, separation and transmission apparatus. The short-range communication system is located between microphone and cord and is attached by XLR or other connection to the vocal capture system (201) and the cord connection (202) that will send signal to sound board or other sound reinforcement system such as a public address system. The short-range communication system will include indicators for on or off, mute, bypass, and low battery (204). It will also include a bypass switch (205) allowing the user to send sound only to the sound board or public address system and not to the monitoring device or headphones, earpieces, headset, earbuds, or earphones. The mute switch (206) will allow the user to send sound only to the monitoring device or headphones, earpieces, headset, earbuds, or earphones and not to the sound board or public address system. A sound modulating system (207) would be integrated into the short-range communication system allowing the user to alter the sound in a variety of ways, including adjustment of monitoring volume for the user. To allow direct monitoring by wired transmission, FIG. 1 shows an ⅛ inch input (208) for wire connected headphones, earpieces, headset, earbuds, or earphones.

201. XLR cable connection to microphone.
202. XLR cable connection to cable/cord with signal to sound reinforcement system (PA).
204. Power on/off/low battery indicator. (Red and Green)
205. Bypass switch
206. Mute switch
207. Sound modulating system
208. ⅛ inch output for ear-buds or ear-phones.

In reference to FIG. 3, a side view of the one or more monitoring devices (signal receiving and sound generation apparatus) is shown. The monitoring devices would include a digital or analog signal receiver (301) corresponding to the one or more short-range communication system, integral with the vocal or instrument signal capture system or located between microphone or instrument and cord. The monitoring devices would include a sound generation mechanism (302) such as a speaker located outside the users ear or penetrating the ear canal. An ear mount system (303) would be used to ensure the monitoring devices remained properly position. The monitoring device could also include a volume control function (304) in order to achieve the desired level of monitoring for the user.

301. Digital or analog signal receiver.
302. Sound generation (speaker).
303. Ear mounting apparatus.
304. Volume control.

In reference to FIG. 4 a vocal capture system comprising a wired or wireless microphone (501) is shown. The wired or wireless microphone would internally incorporate and a short-range communication system (502). For the wired microphone embodiment, the microphone would include an XLR cable connection (503) to send signal to sound board or public address system. FIG. 4 also shows indicators for on or off, mute, bypass, and low battery (508). It also includes a bypass switch (504) allowing the user to send sound only to the sound board or public address system and not to the monitoring device or headphones, earpieces, headset, earbuds, or earphones. The mute switch (505) will allow the user to send sound only to the monitoring device or headphones, earpieces, headset, earbuds, or earphones and not to the sound board or public address system. A sound modulating system (506) would be integrated into the short-range communication system allowing the user to alter the sound in a variety of ways, including adjustment of monitoring volume for the user. To allow direct monitoring by wired transmission, FIG. 4 shows an ⅛ inch input (507) for wire connected headphones, earpieces, headset, earbuds, or earphones.

501. Traditional microphone.
 502. Microphone embedded signal conversion, separation and transmission apparatus.
 503. XLR cable to sound reinforcement system (PA).
 504. Bypass switch
 505. Mute switch
 506. Sound modulating system
 507. ⅛ inch output for ear-buds or ear-phones.
 508. Power on/off/low battery indicator. (Red and Green)

In reference to FIG. 5, a body mounted a monitoring device is shown containing a digital or analog signal receiver (601) and accompanying headphones, earpieces, headset, earbuds, or earphones (602). The body mounted monitoring device would further comprise power on and off as well as low battery indicators (603) as well as a sound modulating system (604) that could control sound effects and volume.

601. Digital or analog signal receiver.
 602. Sound generation (ear bud mounted speaker).
 603. Power on/off/low battery indicator. (Red and Green)
 604. Sound modulating system In reference to FIG. 6, a Head mounted monitoring system is shown. The system would contain a monitoring device and a vocal capture system (701) that transmits the users voice directly to their ear for instant monitoring

701. Signal conversion and direct monitoring system.

Figure 7:
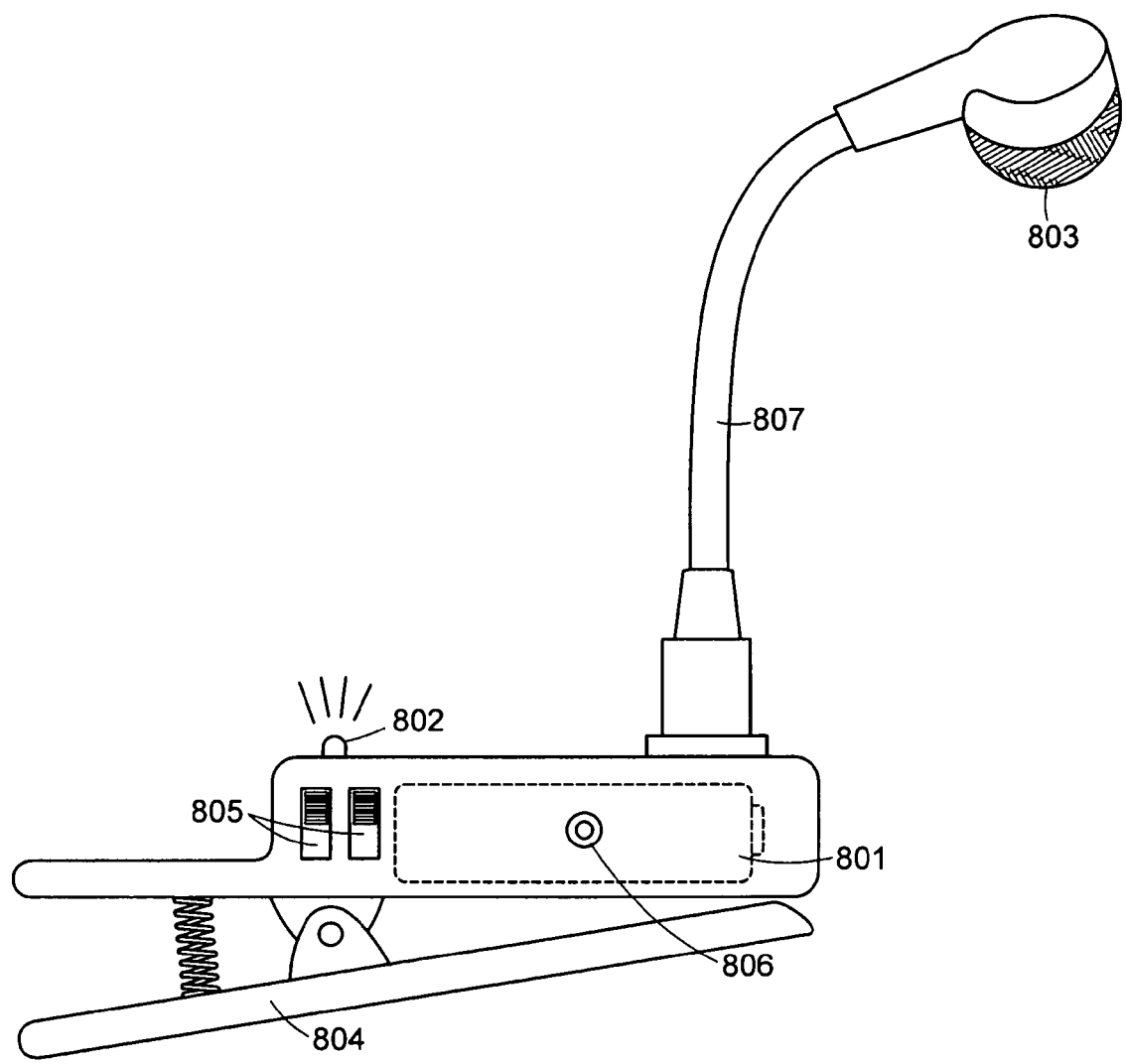
FIG. 7 shows a side view of a clip on microphone monitoring device.

In reference to FIG. 7, a side view of the clip-on microphone monitoring device is shown consisting of a microphone and signal conversion, separation and transmission apparatus. The short-range communication system is fastened or otherwise attached to an instrument (804) and will include a microphone (803) to receive the sound and an adjustable "gooseneck" (807) to adjust the position of the microphone. The clip-on microphone monitoring device will also include a power source (801) and status on or off, mute (805) and low battery indicators (802). FIG. 7 also shows an ⅛ inch input (806) for wire connected headphones, earpieces, headset, earbuds, or earphones.

801. Power supply (single use or rechargeable battery (AA of AAA) or rechargeable power cell).
 802. Power on/off/mute/by-pass/low battery indicator.
 803. Small size microphone.
 804. Instrument fastener or clip.
 805. Mute and Bypass switch.
 806. ⅛ in cable output for headphones.
 807. Adjustable and flexible microphone "gooseneck."

In reference to FIG. 8, a top and side view are shown of an instrument linked monitor device consisting of a signal conversion, separation and transmission apparatus. The short-range communication system is connected to instruments by connection cable (902) and the instrument cord continues on for amplification by cable connection (901). The instrument linked monitoring device will include a power supply source (903) and status indicators (904) or low battery. The instrument linked monitoring device could include mute (906) and bypass (907) functions and a connection for ear. FIG. 8 also shows an ⅛ inch input (905) for wire connected headphones, earpieces, headset, earbuds, or earphones. A sound modulating system (908) would be integrated into the short-range communication system allowing the user to alter the sound in a variety of ways, including adjustment of monitoring volume for the user. A pivot mechanism would also be included (909).

901. ¼ inch, ⅛ inch, midi, or USB cable connections to sound reinforcement system (PA).
 902. ¼ inch, ⅛ inch, midi, or USB cable connections to instrument.
 903. Power supply (single use or rechargeable battery (AA of AAA) or rechargeable power cell).
 904. Power on/off/mute/low battery indicator.
 905. ⅛ inch output for ear-buds or ear-phones.
 906. Bypass switch.
 907. Mute switch.
 908. Sound modulating system.
 909. Pivot mechanism.

Figure 9:
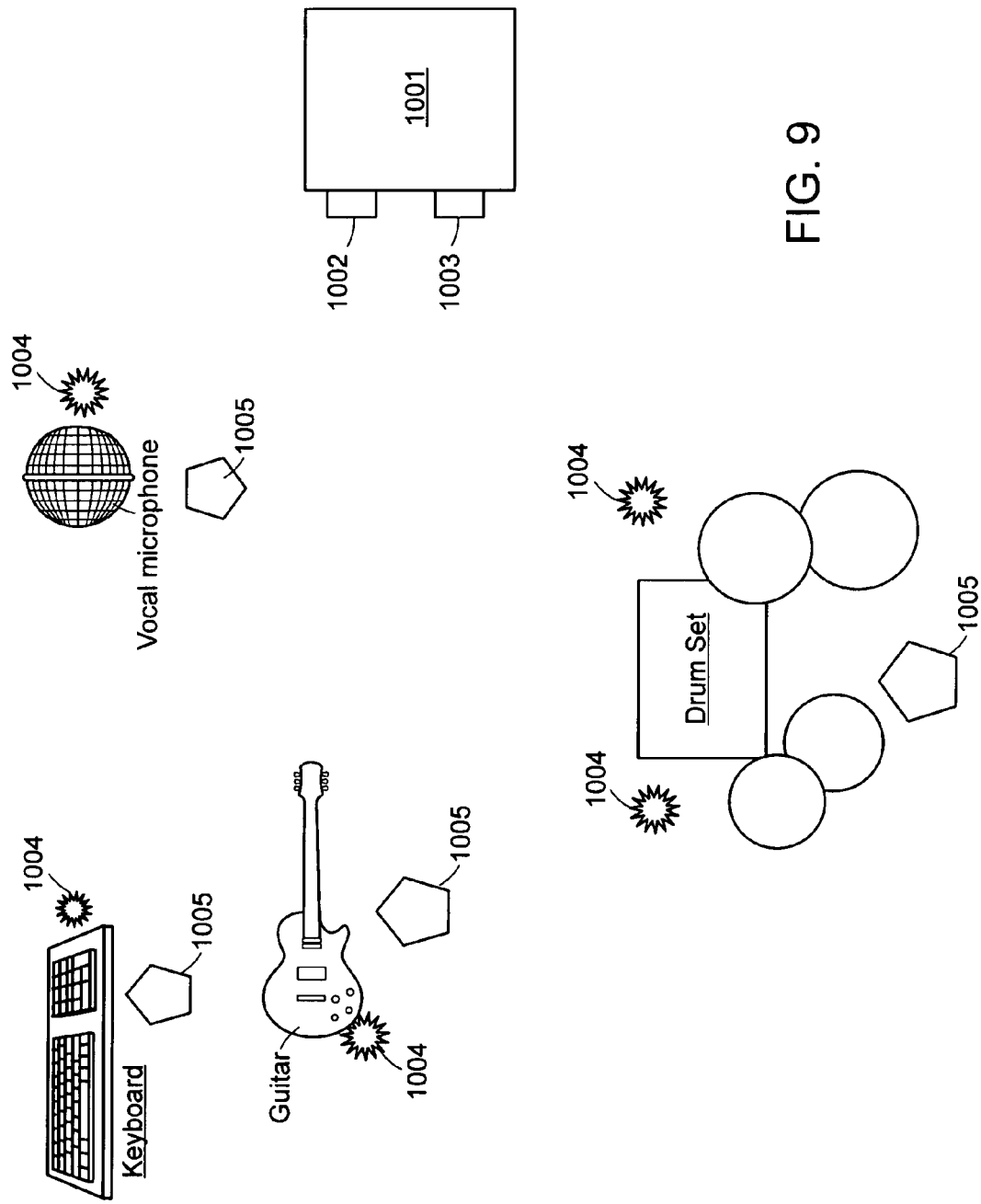
FIG. 9 shows a central mixer based multi-device monitoring system.

In reference to FIG. 9, a central mixer based multi-device monitoring system is shown consisting of a wireless signal receiver (1002), a multi channel sound mixer device (1001) and a wireless signal transmitter device (1003). The central mixer would receive signals from DPM or wireless transmitters (FIG. 1, FIG. 2, FIG. 5, FIG. 7, FIG. 8 and 1004) that are connected to our receiving sound from microphones or instruments. The users of the microphones or instruments would receive user defined sound mix through their body mounted monitoring device (FIG. 3, FIG. 5 and 1005).

1001. Multi channel sound mixer device.
 1002. Wireless signal receiver.
 1003. Wireless signal transmitter.
 1004. DPM or other wireless transmitters.
 1005. Body mounted monitoring devices.

What is claimed is:

1. A direct personal monitor comprising:
a transmitter unit consisting essentially of:
 a first audio connector for receiving audio signals from a single audio source;
 a second audio connector for transmitting said audio signals to a sound modulating device; and
 a wireless transmitter communicatively coupled with the first audio connector and configured to receive said audio signals and to wirelessly transmit said audio signals received from the first audio connector directly to a receiver while also allowing said audio signals to pass through to the second audio connector;
 wherein the transmitter unit splits or duplicates the audio signals received from the first audio connector to produce a first signal component that is transmitted wirelessly by the wireless transmitter to the receiver, and a second signal component that is passed through to the second audio connector.

2. The direct personal monitor of claim 1, wherein the first audio connector is a female XLR connector and the second audio connector is a male XLR connector.

3. The direct personal monitor of claim 1, wherein the first audio connector is a male ¼" TRS connector and the second audio connector is a female ¼" TRS connector.

4. The direct personal monitor of claim 1, wherein the wireless transmitter is configured to wirelessly transmit the audio signals at a frequency of about 2.4 GHz.

5. The direct personal monitor of claim 1, wherein the wireless transmitter is configured to wirelessly transmit the audio signals at RF or infrared frequencies.

6. The direct personal monitor of claim 1, wherein the transmitter unit further comprises a power source.

7. The direct personal monitor of claim 6, wherein the power source is a battery.

8. The direct personal monitor of claim 1, wherein the transmitter unit is powered by phantom power received via the first audio connector or the second audio connector.

9. The direct personal monitor of claim 1, further comprising a receiver.

10. The direct personal monitor of claim 9 wherein the receiver is selected from the group consisting of: headphones, earpieces, a headset, earbuds, or earphones.

11. The direct personal monitor of claim 1, further comprising a vocal capture system.

12. The direct personal monitor of claim 11, wherein the vocal capture system is a wired or wireless microphone.

13. The direct personal monitor of claim 1, further comprising a sound modulating device.

14. The direct personal monitor of claim 13, wherein the sound modulating device is a soundboard.

15. The direct personal monitor of claim 1, wherein the wireless transmitter is configured to wirelessly transmit audio signals in analog.

16. The direct personal monitor of claim 1, wherein the wireless transmitter is configured to wirelessly transmit audio signals in digital.

17. A direct personal monitoring system comprising:
a microphone having a male XLR audio connector;
a transmitter unit consisting essentially of:
  a female XLR audio connector for receiving audio signals from the microphone;
  a male XLR audio connector for transmitting said audio signals to a sound modulating device; and
  a wireless transmitter communicatively coupled with the female XLR audio connector and configured to receive said audio signals and to wirelessly transmit said audio signals received from the female XLR audio connector directly to a receiver while also allowing said audio signals to pass through to the male XLR audio connector;
wherein the female XLR audio connector of the transmitter unit is detachably coupled to the male XLR audio connector of the microphone, and
wherein the transmitter unit splits or duplicates the audio signals received from the female XLR audio connector to produce a first signal component that is transmitted wirelessly by the wireless transmitter to the receiver, and a second signal component that is passed through to the male XLR audio connector.

18. The direct personal monitoring system of claim 17, further comprising: an audio cable including a female XLR audio connector, wherein the female XLR audio connector of the audio cable is detachably coupled to the male XLR audio connector of the transmitter unit.

19. A direct personal monitoring system comprising:
a musical instrument having a female ¼" TRS audio connector;
a transmitter unit consisting essentially of:
  a male ¼" TRS audio connector for receiving audio signals from the musical instrument;
  a female ¼" TRS audio connector for transmitting said audio signals to a sound modulating device; and
  a wireless transmitter communicatively coupled with the male ¼" TRS audio connector and configured to receive said audio signals and to wirelessly transmit said audio signals received from the male ¼" TRS audio connector directly to a receiver while also allowing said audio signals to pass through to the female ¼" TRS audio connector;
wherein the male ¼" TRS audio connector of the transmitter unit is detachably coupled to the female ¼" TRS audio connector of the musical instrument, and
wherein the transmitter unit splits or duplicates the audio signals received from the male ¼" TRS audio connector to produce a first signal component that is transmitted wirelessly by the wireless transmitter to the receiver, and a second signal component that is passed through to the female ¼" TRS audio connector.

20. The direct personal monitoring system of claim 19, further comprising: an audio cable including a male ¼" TRS audio connector, wherein the male ¼" TRS audio connector of the audio cable is detachably coupled to the female ¼" TRS audio connector of the transmitter unit.

21. The direct personal monitoring system of claim 19, wherein the musical instrument is selected from the group consisting of: an electric guitar, a bass guitar, a Rhodes piano, and a synthesizer.

* * * * *